US009272422B2

(12) United States Patent
Matsuoka (10) Patent No.: US 9,272,422 B2
(45) Date of Patent: Mar. 1, 2016

(54) GRASPING METHOD BY GRASPING APPARATUS

(71) Applicant: Hirofumi Matsuoka, Nagoya (JP)

(72) Inventor: Hirofumi Matsuoka, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/410,865

(22) PCT Filed: Jun. 10, 2013

(86) PCT No.: PCT/IB2013/001207
§ 371 (c)(1),
(2) Date: Dec. 23, 2014

(87) PCT Pub. No.: WO2014/001866
PCT Pub. Date: Jan. 3, 2014

(65) Prior Publication Data
US 2015/0190929 A1    Jul. 9, 2015

(30) Foreign Application Priority Data

Jun. 29, 2012 (JP) ................................. 2012-147893

(51) Int. Cl.
*B66F 19/00*     (2006.01)
*B25J 15/00*     (2006.01)
(Continued)

(52) U.S. Cl.
CPC .......... *B25J 15/0033* (2013.01); *B25J 15/0028* (2013.01); *B25J 15/08* (2013.01); *B25J 15/12* (2013.01)

(58) Field of Classification Search
CPC ...... A47G 21/10; B25J 15/00; B25J 15/0009; B25J 15/0033; B25J 15/08; B25J 15/12; B25J 15/0028; A01D 87/003; B25B 9/00; B66C 1/24; B66C 1/585
See application file for complete search history.

(56) References Cited

U.S. PATENT DOCUMENTS 4,621,852 A * 11/1986 Maki ............................ 294/86.4
4,718,709 A *  1/1988 Myers et al. ................... 294/106
(Continued)

FOREIGN PATENT DOCUMENTS

DE    28 40 188 A1    3/1980
JP    62-152690 A     7/1987
(Continued)

OTHER PUBLICATIONS

International Search Report and Written Opinion issued Jan. 2, 2014 in PCT/IB2013/001207 Filed Jun. 10, 2013.
(Continued)

*Primary Examiner* — Stephen Vu
(74) *Attorney, Agent, or Firm* — Oblon, McClelland, Maier & Neustadt, L.L.P.

(57) ABSTRACT

A grasping method is by a grasping apparatus that is provided with a grasping portion that has a plurality of pawl portions, and a plurality of contact portions that are provided on portions of the plurality of pawl portions, which contact a workpiece, and that are able to be hardened. The grasping method includes conforming the contact portions to an outer shape of a master workpiece that has an outer shape that is able to deform the contact portions to a shape for positioning the workpiece; hardening the contact portions in a state conformed to the outer shape of the master workpiece; positioning the workpiece; and grasping the positioned workpiece with the grasping portion by hardening the contact portions while keeping the contact portions in the shape conformed to the outer shape of the workpiece.

3 Claims, 8 Drawing Sheets

(51) Int. Cl.
*B25J 15/08* (2006.01)
*B25J 15/12* (2006.01)

(56) References Cited

U.S. PATENT DOCUMENTS

| | | | |
|---|---|---|---|
| 7,207,610 B1 * | 4/2007 | Kauppila | 294/198 |
| 8,317,241 B2 * | 11/2012 | Ehnes et al. | 294/2 |
| 2013/0106127 A1 | 5/2013 | Lipson et al. | |

FOREIGN PATENT DOCUMENTS

| | | |
|---|---|---|
| JP | 09-123082 A | 5/1997 |
| JP | 11-207680 A | 8/1999 |
| JP | 2006-007337 A | 1/2006 |
| JP | 2012-24882 A | 2/2012 |
| JP | 2012-86340 A | 5/2012 |
| WO | WO 2011/130475 A2 | 10/2011 |
| WO | WO 2011/135450 A1 | 11/2011 |
| WO | WO 2012/053416 A1 | 4/2012 |

OTHER PUBLICATIONS

Partial English language translation of Notification of Reason(s) for Refusal issued Jul. 28, 2015 in Japanese Patent Application No. 2012-147893.

* cited by examiner

FIG. 8B

GRASPING METHOD BY GRASPING APPARATUS

BACKGROUND OF THE INVENTION

1. Field of the Invention

The invention relates to a grasping method by a grasping apparatus capable of grasping a plurality of types of workpieces of different shapes.

2. Description of Related Art

When handling a plurality of types of workpieces of different shapes with a grasping apparatus that grasps a workpiece or a product or the like, it is troublesome to replace a contact portion, i.e., a portion of the grasping apparatus that directly contacts the workpiece or the like, with a portion corresponding to the shape of each workpiece. Therefore, it has been hoped that a grasping apparatus capable of flexibly handling a variety of types of workpieces having different outer shapes would be developed. Hence, various technologies for grasping apparatuses that are capable of successfully grasping a variety of types of workpieces having different outer shapes have been examined. Japanese Patent Application Publication No. 9-123082 (JP-A-9-123082), for example, described below describes just such a technology.

JP-A-9-123082 describes a grasping apparatus provided with a contact portion capable of handling various outer shapes by encapsulating a large amount of granular substance inside a flexible membrane, and reducing the pressure in the membrane using a vacuum pump or the like, or canceling that pressure reduction. With this grasping apparatus, a contact portion is arranged at a tip end of a support device such as a robotic arm or the like. Also, with a grasping operation by the robotic arm or the like, the contact portion is made to abut against the workpiece or the like and conform to the shape of the workpiece or the like. Then the pressure inside the contact portion is reduced such that the large amount of granular substance inside the membrane is tightly compressed and fixed in place, such that the shape of the contact portion is kept conformed to the shape of the workpiece. Also, with this grasping apparatus, the contact portion is returned to a softened state by canceling the reduced pressure state in the contact portion. Also, using such a grasping apparatus enables the shape of the contact portion to match the outer shapes of various workpieces and the like. As a result, when handling a plurality of various workpieces having different outer shapes, the workpieces can be stably grasped.

Use of a grasping apparatus having this kind of contact portion is premised on the contact portion being deformed to match the outer shape of a workpiece that has already been positioned. A workpiece that is already positioned to match a position specified by the next process is gripped and grasped by the contact portion, and transported.

That is, the shape of the contact portion of this kind of grasping apparatus is not uniform, so the grasping apparatus is not well suited for positioning a workpiece that is not yet positioned. The workpiece is not able to be accurately positioned using only this kind of grasping apparatus.

SUMMARY OF THE INVENTION

The invention thus provides a grasping method by a grasping apparatus that is capable of accurately positioning a workpiece, with a grasping apparatus having a contact portion that is able to deform to match the shape of the workpiece, by hardening the contact portion.

One aspect of the invention relates to a grasping method by a grasping apparatus that is provided with a grasping portion that grasps a workpiece and has a plurality of pawl portions that grip the workpiece, and a plurality of contact portions that are provided on portions of the plurality of pawl portions, which contact the workpiece, and that are able to be hardened. This grasping method includes conforming the contact portions to an outer shape of a master workpiece that has an outer shape that is able to deform the contact portions to a shape for positioning the workpiece; hardening the contact portions in a state conformed to the outer shape of the master workpiece and deformed to the shape for positioning the workpiece; positioning the workpiece by pushing the workpiece with the contact portions having the shape for positioning the workpiece; and grasping the positioned workpiece with the grasping portion.

According to this aspect, the workpiece is able to be positioned by the grasping apparatus having the contact portions that are able to be hardened.

In the aspect described above, each of the contact portions may include a bag-shaped member made of elastic material, and a granular substance filled in the bag-shaped member. Also, the grasping portion may grasp the workpiece by gripping the workpiece with the plurality of contact portions, by displacing the plurality of pawl portions, and while gripping the workpiece, hardening the granular substance while keeping the granular substance in a shape conformed to the outer shape of the workpiece, by increasing a volume ratio of the granular substance with respect to an inner volume of the bag-shaped member.

The grasping method described above may also include, after positioning the workpiece and before grasping the workpiece with the grasping portion, relaxing the shape for positioning the workpiece, of the contact portions.

According to the structure described above, the life of the contact portion is able to be inhibited from becoming shorter by positioning the workpiece with the grasping apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
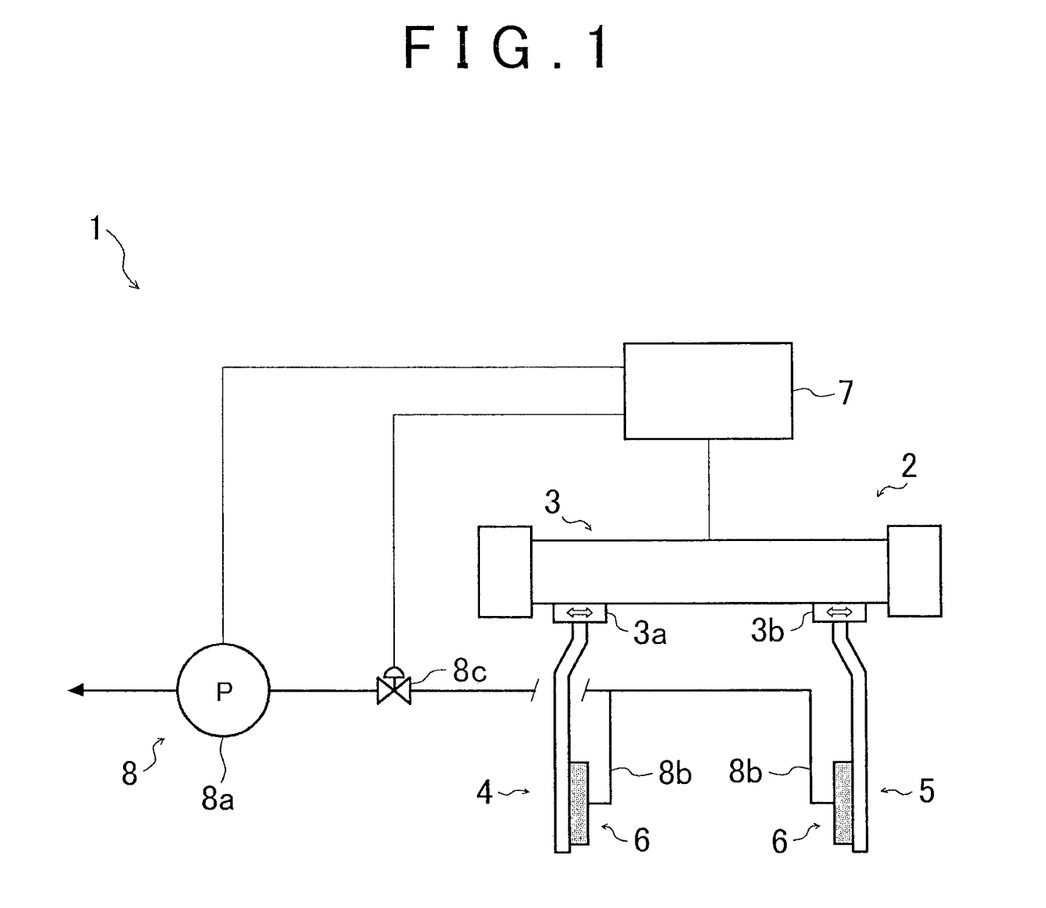
FIG. 1 is a view showing a frame format of the overall structure of a grasping apparatus according to one example embodiment of the invention.

Next, example embodiments of the invention will be described. First, the overall structure of a grasping apparatus that realizes a grasping method according to one example embodiment of the invention will be described with reference to FIGS. 1 to 3B. As shown in FIG. 1, the grasping apparatus 1 that realizes the grasping method according to the example embodiment of the invention is an apparatus for grasping and holding a workpiece or the like, and includes a grasping portion 2, a control device 7, and evacuation equipment 8 and the like. The grasping portion 2 is a portion of the grasping apparatus 1 that directly grasps the workpiece, and includes a driving portion 3, a plurality of pawl portions 4 and 5, and a plurality of contact portions 6 and the like.

As shown in FIGS. 1, and 2A, 2B, and 2C, the driving portion 3 is an apparatus that is provided with slider portions 3a and 3b of two systems, and is able to reciprocally displace each of these slider portions 3a and 3b, either independently or in left-right conjunction, with respect to the same axial direction. An electric actuator or the like that is provided with a reciprocating mechanism formed by a ball screw and nut and a motor or the like may be used as the driving portion 3, for example.

The pawl portions 4 and 5 are a pair of portions provided for clamping the workpiece. That is, the pawl portions 4 and 5 are portions that clamp and hold a workpiece arranged in a position between them. The shapes of the pawl portions 4 and 5 are set taking into account the shape and size of the workpiece to be grasped, and the stroke amount of the slider portions 3a and 3b and the like.

Figure 2A:
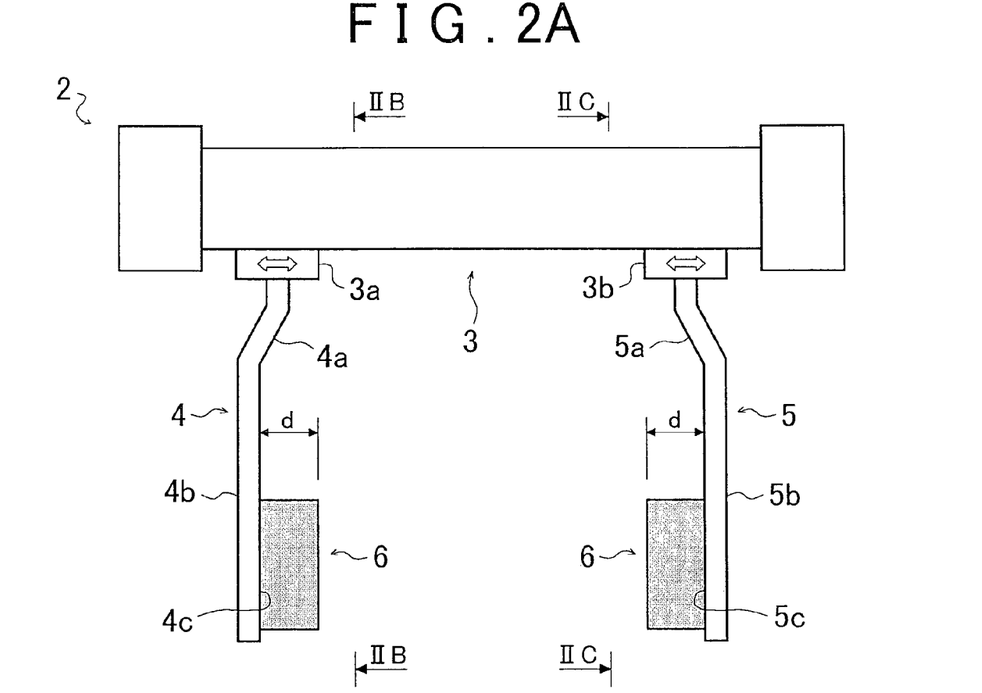
FIG. 2A is a detailed front view showing a frame format of a grasping portion of the grasping apparatus according to the example embodiment of the invention.
Figure 2B:
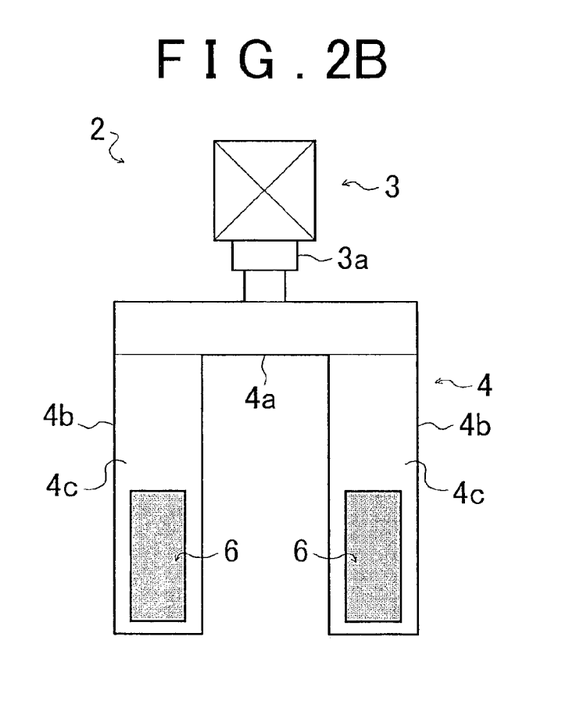
FIG. 2B is a sectional view taken along line IIB-IIB in FIG. 2A, of the grasping portion of the grasping apparatus according to the example embodiment of the invention.

As shown in FIGS. 2A and 2B, the pawl portion 4 includes a support portion 4a and two clip portions 4b that protrude from the support portion 4a. The clip portions 4b are arranged a predetermined distance apart from one another. Also, the surface of the pawl portion 4 on the side where the contact portion 6 is attached serves as a surface 4c. The support portion 4a is fixed to the slider portion 3a. The control device 7 operates the driving portion 3 to slide the slider portion 3a such that the clip portions move in a reciprocating manner in the sliding direction of the slider portion 3a (see FIG. 1).

Figure 2C:
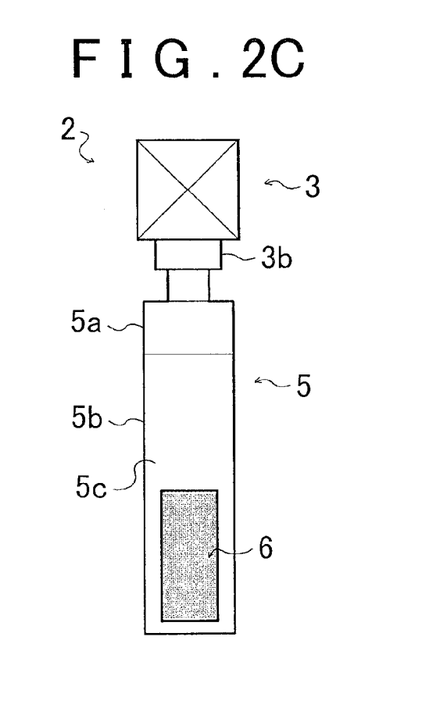
FIG. 2C is a sectional view taken along line IIC-IIC in FIG. 2A, of the grasping portion of the grasping apparatus according to the example embodiment of the invention.

Also, as shown in FIGS. 2A and 2C, the pawl portion 5 includes a support portion 5a and one clip portion 5b that protrudes from the support portion 5a. Also, the surface of the pawl portion 5 on the side where the contact portion 6 is attached serves as a surface 5c. The support portion 5a is fixed to the slider portion 3b. The control device 7 operates the driving portion 3 to slide the slider portion 3b such that the clip portion 5b moves in a reciprocating manner in the sliding direction of the slider portion 3b (see FIG. 1).

As shown in FIGS. 1 and 2A, 2B, and 2C, the contact portion 6 is a portion of the grasping apparatus 1 that directly contacts the workpiece. The contact portion 6 is able to take on two opposite forms, i.e., one in which the shape of the contact portion 6 is able to flexibly deform and another in which the shape of the contact portion 6 is firmly maintained, with a single member.

Figure 3A:
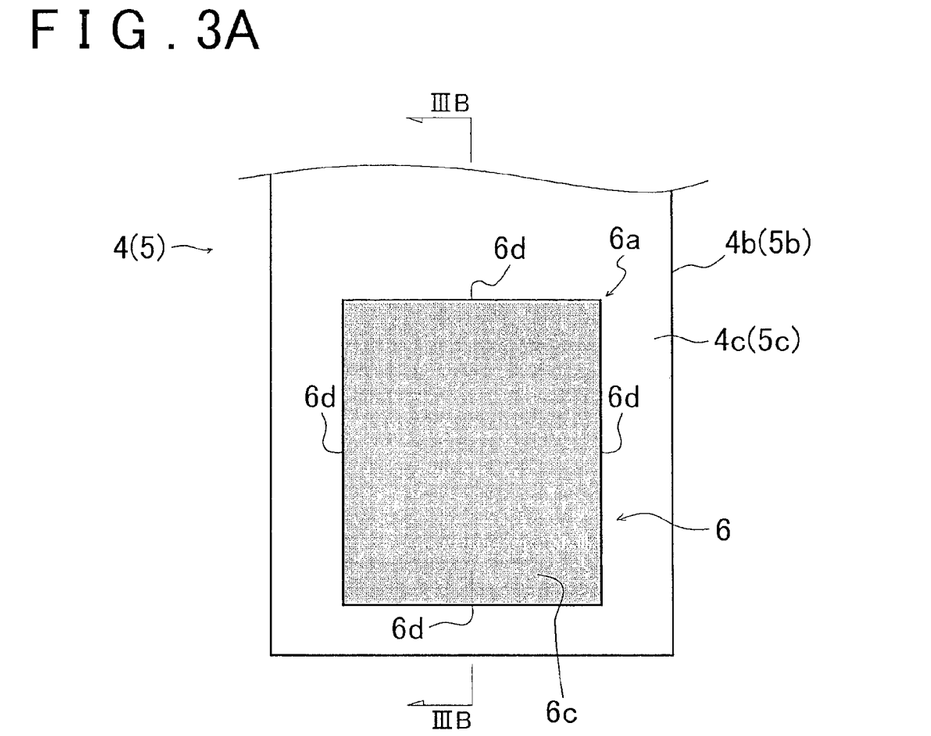
FIG. 3A is a detailed front view showing a frame format of a contact portion of the grasping portion according to the example embodiment of the invention.
Figure 3B:
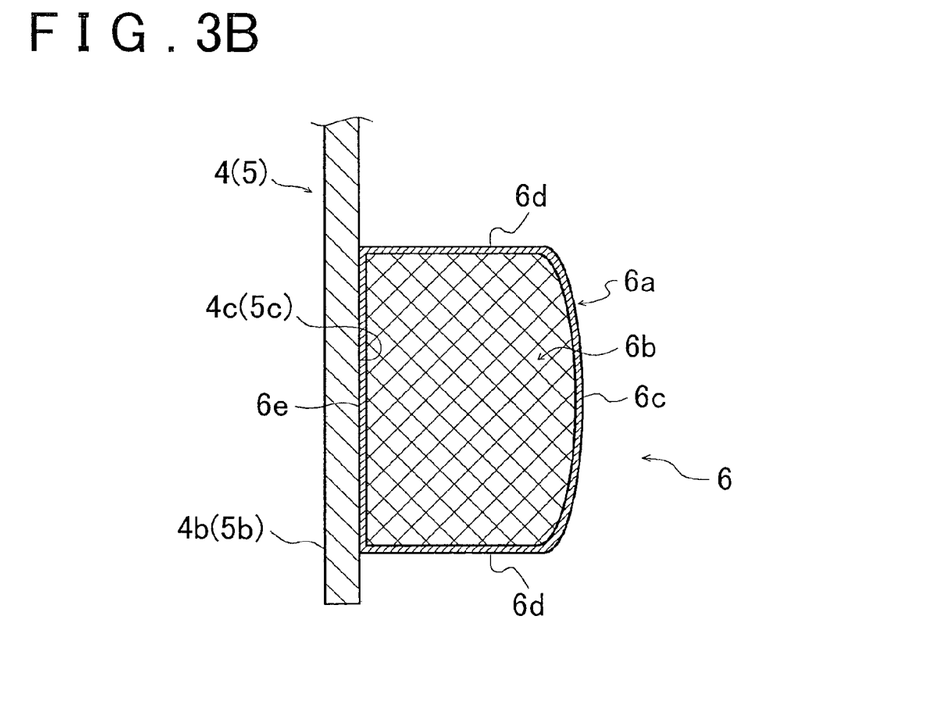
FIG. 3B is a sectional view taken along line IIIB-IIIB in FIG. 3A, of the contact portion of the grasping portion.

Here, the contact portion 6 will be described in further detail. As shown in FIGS. 3A and 3B, the contact portion 6 includes a bag-shaped member 6a that is an elastic generally bag-shaped member, and a granular substance 6b that is filled into this bag-shaped member 6a. Normally, the contact portion 6 takes on the form in which it is able to flexibly deform. Also, the contact portion 6 is attached to the surfaces 4c and 5c of the clip portions 4b and 5b of the pawl portions 4 and 5. The term "normally" here refers to when the pressure in the bag-shaped member 6a is near atmospheric pressure, and the granular substance 6b is able to flow. Also, the contact portion 6 in a state in which the pressure in the bag-shaped member 6a is near atmospheric pressure and the granular substance 6b is able to flow may also be referred to as the contact portion 6 in a "normal state" (the same applies hereinafter).

The bag-shaped member 6a includes a front portion 6c, side portions 6d, and a back portion 6e. The front portion 6c forms a surface that abuts against the workpiece and is generally perpendicular to a direction in which the contact portion 6 grips the workpiece. The side portions 6d are surfaces that are continuous with the front portion 6c and are generally orthogonal to the front portion 6c, and form a thickness in the direction in which the contact portion 6 grips the workpiece. The back portion 6e forms a surface that is continuous with the side portions 6d and is generally orthogonal to the side portions 6d, and is for attaching the contact portion 6 to the surface 4c and 5c. In this example embodiment, the shape of the bag-shaped member 6a is generally rectangular parallelepiped, but the shape of the contact portion (i.e., the bag-shaped member) that forms the grasping apparatus used in the grasping method according to the invention is not limited to this.

As shown in FIG. 1, the contact portions 6 (see FIGS. 2A, 2B, and 2C) are connected to the evacuation equipment 8, while being provided on the clip portions 4b and 5b of the pawl portions 4 and 5. The evacuation equipment 8 forms means for making the contact portions 6 hard and soft in the grasping apparatus 1, and includes a vacuum pump 8a, vacuum ducts 8b, and an electromagnetic valve 8c and the like. The vacuum ducts 8b are connected to the bag-shaped members 6a of the contact portions 6 (see FIGS. 3A and 3B). In this example embodiment, the vacuum pump 8a is provided in the evacuation equipment 8, but a structure in which evacuating means other than the vacuum pump 8a (such as an ejector or the like) is provided is also possible. Further, in the grasping apparatus that realizes the grasping method of the invention, the means for making the contact portion hard and soft is not necessarily limited to the evacuation equipment. That is, any of various modes capable of making the contact portion hard and soft may be employed.

When the inside of the bag-shaped portion 6a is reduced in pressure by operating the vacuum pump 8a, the contact portion 6 becomes hard due to the grains that make up the granular substance 6b that is filled inside the bag-shaped portion 6a being held together more tightly because of increasing the volume ratio of the granular substance 6b to the bag-shaped portion 6a. Therefore, at this time, the contact portion 6 takes on the form in which its shape is firmly maintained.

When this contact portion 6 is pressed, in a flexible state, against the workpiece by the clamping pressure of the pawl portions 4 and 5, the contact portion 6 is able to fit into concave portions and around convex portions on the surface of the workpiece, thus enabling the front portion 6c of the contact portion 6 to conform to the shape of the outer surface of the workpiece.

Also, the contact portion 6 is able to be made hard in a shape corresponding to (conforming to) the shape of the outer surface of the workpiece by activating the evacuation equipment 8 while the front portion 6c is conformed to the shape of the outer surface of the workpiece. Therefore, a hard contact portion 6 that corresponds to the shape of the outer surface of the workpiece can be formed.

In this way, with the grasping portion 2 according to this example embodiment, a workpiece can be firmly grasped at three points by the contact portions 6 that are attached to the grip portions 4b and 5b. Thus, a more stable grasping state that is able to withstand the workpiece being swung around or the like can be realized by a simple structure with few component parts. In this example embodiment, a mode is described in which the workpiece is supported at three points by the grasping portion 2. However, the number of points at which the workpiece is supported in the grasping apparatus that realizes the grasping method of the invention is not limited to this. For example, the number of points at which the workpiece is supported may also be two, or four or more.

Next, the grasping method by the grasping apparatus according to this example embodiment of the invention will be described with reference to FIGS. 4 to 7B. The grasping method according to this example embodiment of the invention is a grasping method that is able to be realized using the grasping apparatus 1 (see FIG. 1) described above. Here, a case in which a workpiece 50 is positioned by the grasping apparatus 1 as shown in FIGS. 6A to 7B will be illustrated.

Figure 4:
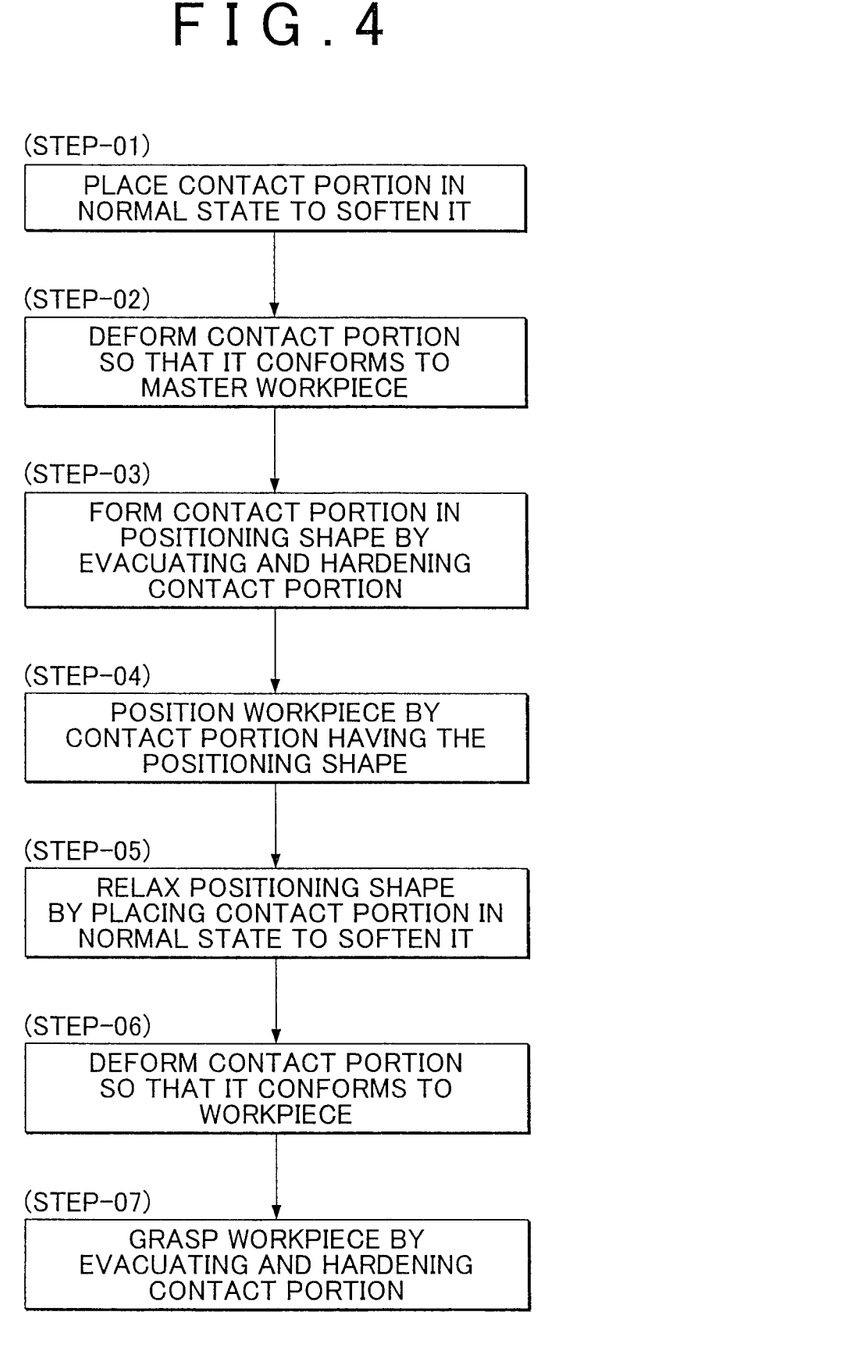
FIG. 4 is a view showing a frame format of the flow of a grasping method by the grasping apparatus according to the example embodiment of the invention.
Figure 5A:
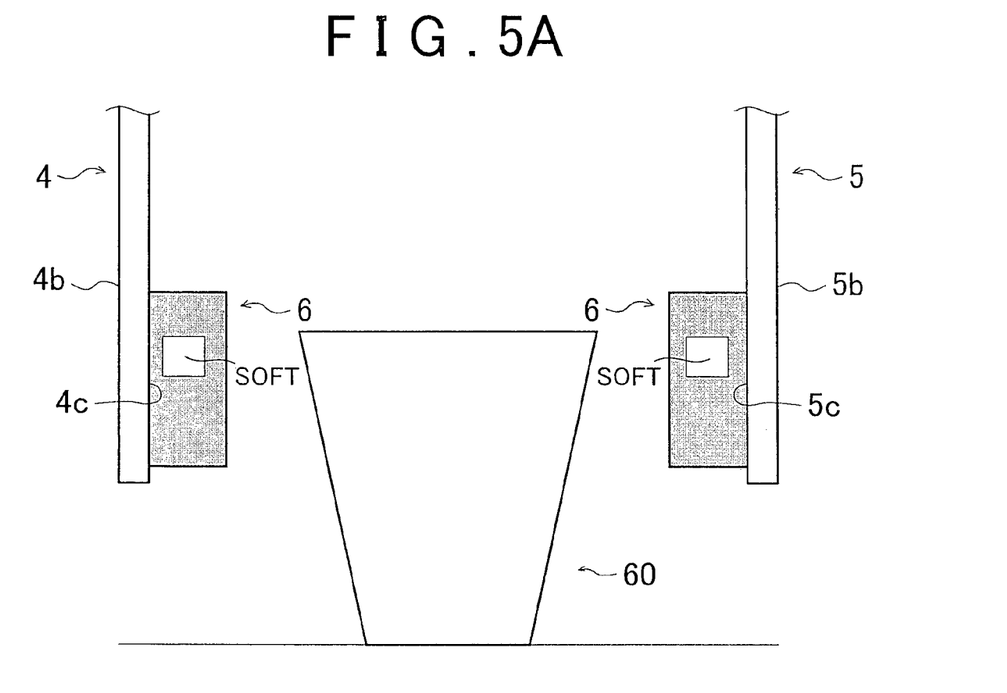
FIG. 5A is a view showing a frame format of a grasping state (before the contact portions conform to a master workpiece) in a preparation process according to the grasping method according to the example embodiment of the invention.

As shown in FIGS. 4 and 5A, in the grasping method by the grasping apparatus 1 according to the example embodiment of the invention, first the contact portions 6 are placed in a normal state and made soft by opening the inside of the contact portions 6 to the ambient air (STEP-01). The term "soft" here refers to the contact portions 6 being in a state in which the shape of the contact portions 6 is able to deform along the outer surface of the workpiece by the contact portions 6 being pressed against the workpiece.

Figure 5B:
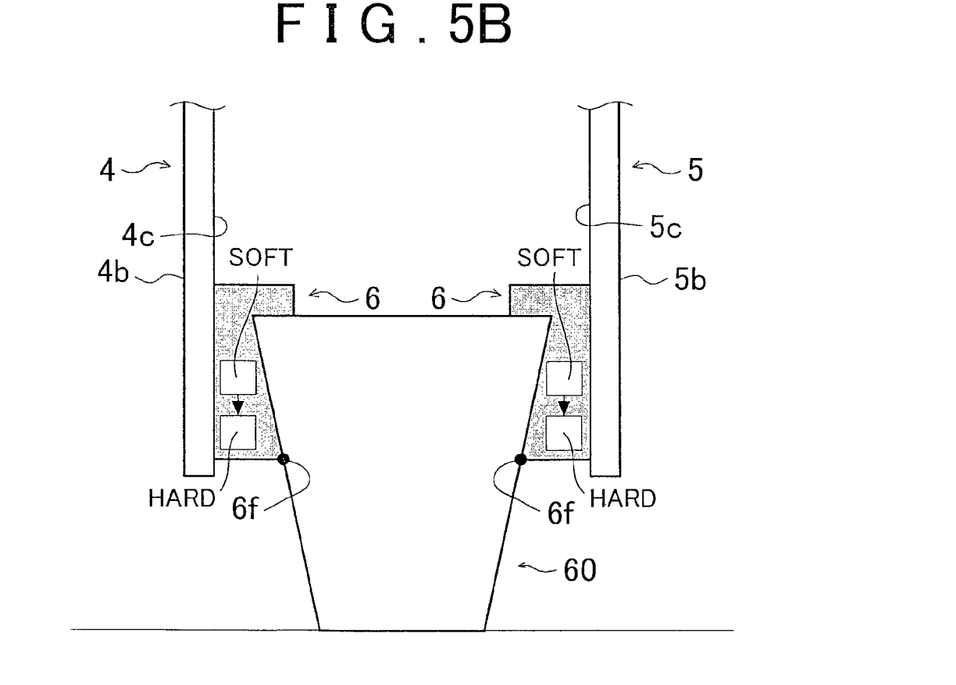
FIG. 5B is a view showing a frame format of a grasping state (when the contact portions have conformed to the master workpiece) in the preparation process according to the grasping method according to the example embodiment of the invention.

Next, as shown in FIGS. 4 and 5B, in the grasping method by the grasping apparatus 1 according to the example embodiment of the invention, the contact portions 6 are pressed against a master workpiece 60 such that they deform conforming to the outer shape of the master workpiece 60 (STEP-02). Then while the contact portions 6 are deformed conforming to the master workpiece 60, the contact portions 6 are hardened by evacuating the insides of the contact portions 6 (STEP-03).

At this time, the contact portions 6 are shapes suited for positioning the workpiece 50 (see FIGS. 6A and 6B) (hereinafter these shapes will be referred to as "positioning shapes"). In other words, the master workpiece 60 has an outer shape suited for deforming the contact portions 6 into the positioning shapes.

The positioning shapes formed by the master workpiece 60 illustrated in this example embodiment are shapes in which positioning portions 6f that are portions that protrude a predetermined distance from the surfaces 4c and 5c of the clip portions 4b and 5b of the pawl portions 4 and 5.

The shapes of the positioning portions 6f may be selected to match the shape of the work to be positioned, such as point-like, linear, or sheet-shaped. Also, a shape that is able to be easily reproduced (i.e., is always in the same location and at the same height) and that is able to form the positioning portions 6f is selected for the master workpiece 60, and this shape is preferably simple with few irregularities or the like.

Figure 6A:
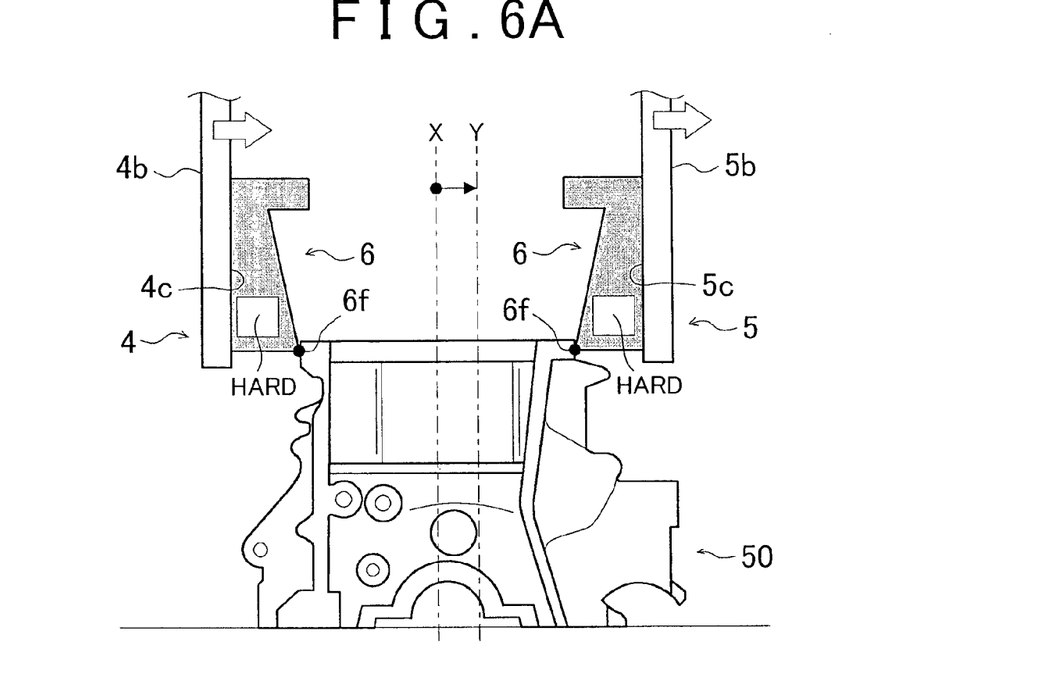
FIG. 6A is a view showing a frame format of a grasping state (when a protruding portion is abutted against a predetermined position of a workpiece) in a positioning process according to the grasping method according to the example embodiment of the invention.
Figure 6B:
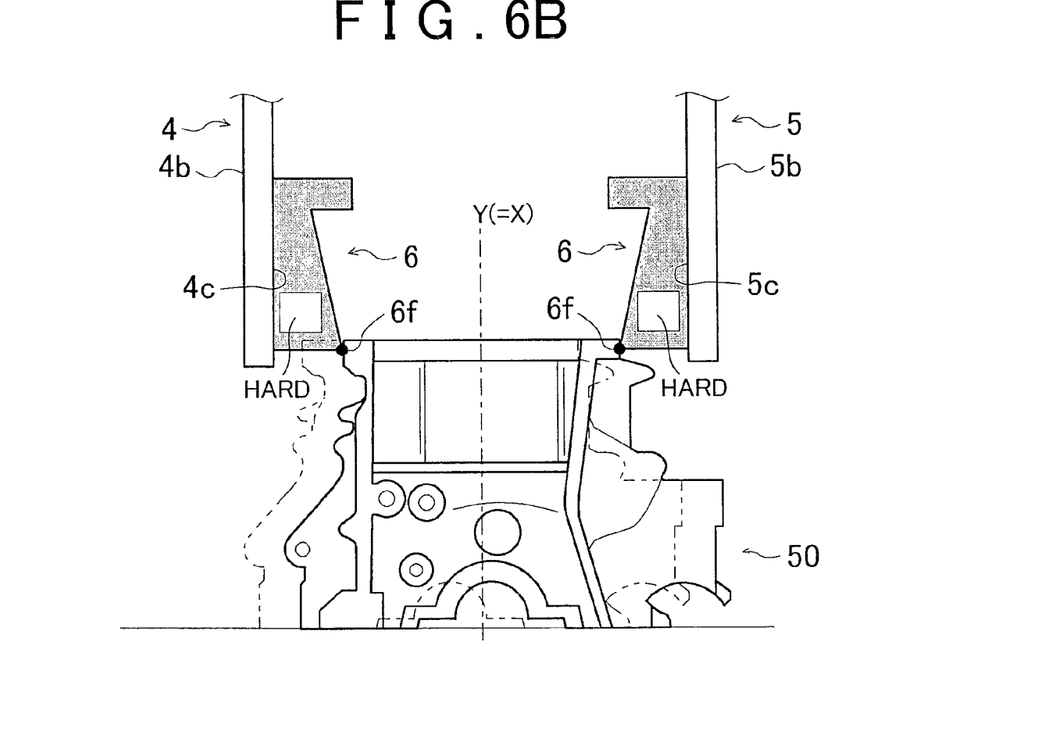
FIG. 6B is a view showing a frame format of a grasping state (when positioning by the contact portions is complete) in the positioning process according to the grasping method according to the example embodiment of the invention.
Figure 7A:
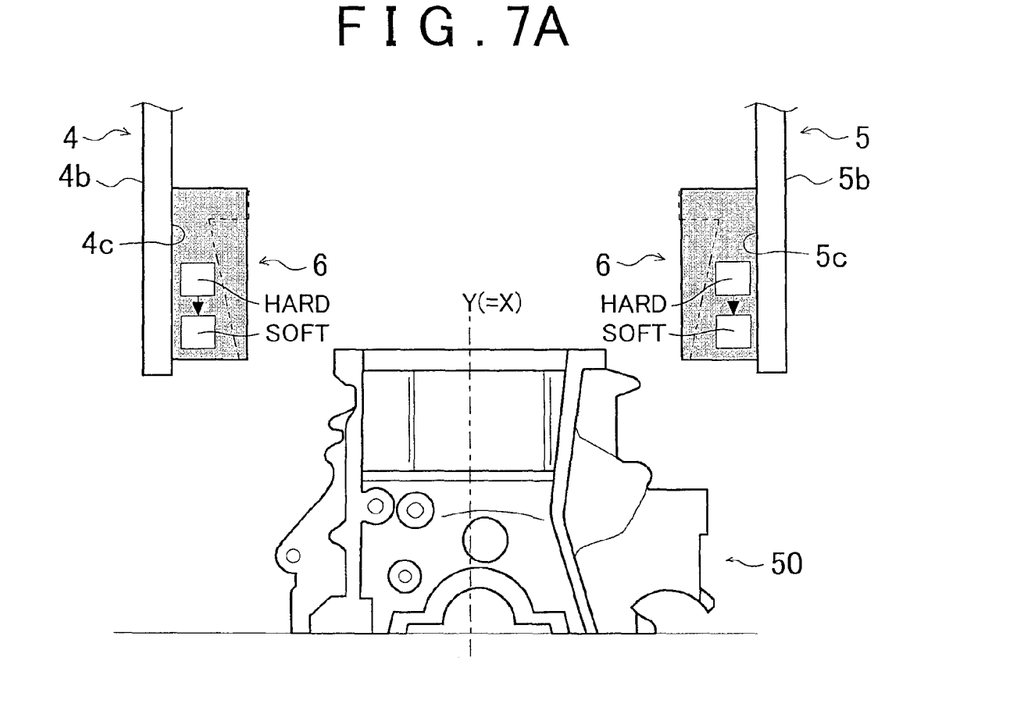
FIG. 7A is a view showing a frame format of a grasping state (when the contact portions have been softened) in a restoring process according to the grasping method according to the example embodiment of the invention.
Figure 7B:
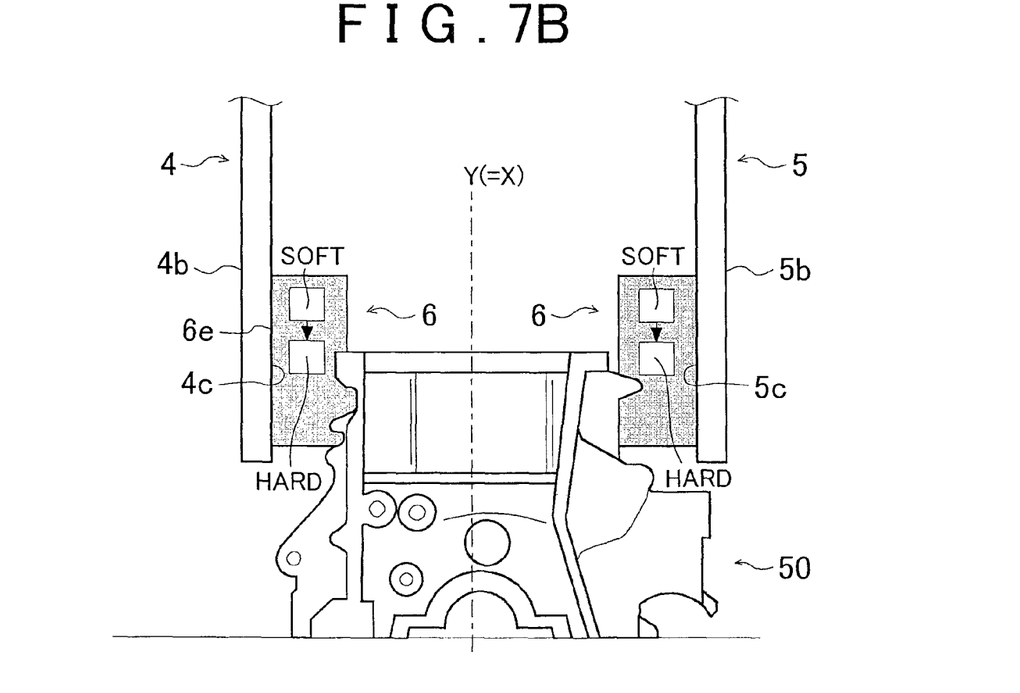
FIG. 7B is a view showing a frame format of a grasping state (when the contact portions are grasping the workpiece) in a grasping process according to the grasping method according to the example embodiment of the invention.

Next, as shown in FIGS. 4 and 6A, in the grasping method by the grasping apparatus 1 according to the example embodiment of the invention, the positioning portions 6f push the actual workpiece 50 while contacting predetermined positions of the workpiece 50. Then as shown in FIG. 6B, the workpiece 50 is positioned by displacing the workpiece 50 such that an axis X of the workpiece 50 aligns with a position Y where the axis should be arranged (STEP-04).

The positioning portions 6f are portions that are able to be formed at always the same position and the same height. Therefore, the workpiece 50 is able to be displaced a set distance in a set direction by displacing the workpiece 50 while pushing the workpiece 50 with the positioning portions 6f. As a result, the workpiece 50 is able to be positioned in a predetermined position using the grasping apparatus 1.

Then when the positioning of the workpiece 50 is complete, the positioning shapes of the positioning portions 6f are relaxed by placing the contact portions 6 in the normal state so that they are soft again (STEP-05).

By relaxing the positioning portions 6f formed on the contact portions 6 before grasping the workpiece 50 with the grasping portion 2 in this way, the portions corresponding to the positioning portions 6f of the contact portions 6 are made to selectively contact the workpiece 50 when the workpiece 50 is grasped by the grasping portion 2, so damage due to premature wear or the like of the portions corresponding to the positioning portions 6f is able to be inhibited.

Then the workpiece 50 grasps the grasping apparatus 1. That is, the contact portions 6 are pressed against the workpiece 50, and the contact portions 6 are deformed conforming to the outer shape of the workpiece 50 (STEP-06). Then while the contact portions 6 are in a state deformed conforming to the workpiece 50, the pawl portions 4 and 5 grip the workpiece 50 while the contact portions 6 are hardened by evacuating the inside of the contact portions 6, and the workpiece 50 is reliably grasped by the grasping portion 2 (STEP-07).

That is, the grasping method by a grasping apparatus according to the example embodiment of the invention is a grasping method by a grasping apparatus 1 that is provided with a grasping portion 2 that has a plurality of pawl portions 4 and 5 for gripping a workpiece 50, and a plurality of contact portions 6 that are provided on portions of the plurality of pawl portions 4 and 5 that contact the workpiece 50, each of the contact portions 6 having a bag-shaped member 6a that is made of elastic material, and a granular substance 6b filled in the bag-shaped member 6a, the grasping portion 2 grasping the workpiece 50 by gripping the workpiece 50 with the plurality of contact portions 6, by displacing the plurality of pawl portions 4 and 5, and while gripping the workpiece 50, hardening the granular substance 6b while keeping the granular substance 6b in a shape conformed to an outer shape of the workpiece 50, by increasing a volume ratio of the granular substance 6b with respect to an inner volume of the bag-shaped member 6a. This grasping method includes conforming the contact portions 6 to an outer shape of a master workpiece 60 that has an outer shape that is able to deform the contact portions 6 to a shape for positioning the workpiece (i.e., a positioning shape), using the master workpiece 60 (STEP-02); hardening the contact portions 6 in a state deformed to the positioning shape (STEP-03); positioning the workpiece 50 by pushing the workpiece 50 with the contact portions 6 having the positioning shape (i.e., having positioning portions 6f) (STEP-04); and grasping the positioned workpiece 50 with the grasping portion 2 ((STEP-06) and (STEP-07)). According to this kind of structure, the workpiece 50 is able to be positioned by the grasping apparatus 1 that has the contact portions 6 that can be hardened and softened.

Also, the grasping method by the grasping apparatus 1 according to this example embodiment of the invention includes, after positioning the workpiece 50 (STEP-04) and before grasping the workpiece 50 with the grasping portion 2 ((STEP-06) and (STEP-07)), relaxing the shape for positioning the workpiece 50, of the contact portions 6 (i.e., the positioning shape having the positioning portions 6f) (STEP-05). According to this kind of structure, positioning the workpiece 50 with the grasping apparatus 1 enables the life of the contact portions 6 to be inhibited from becoming shorter due to wear and the like of the portions corresponding to the positioning portions 6f.

Figure 8A:
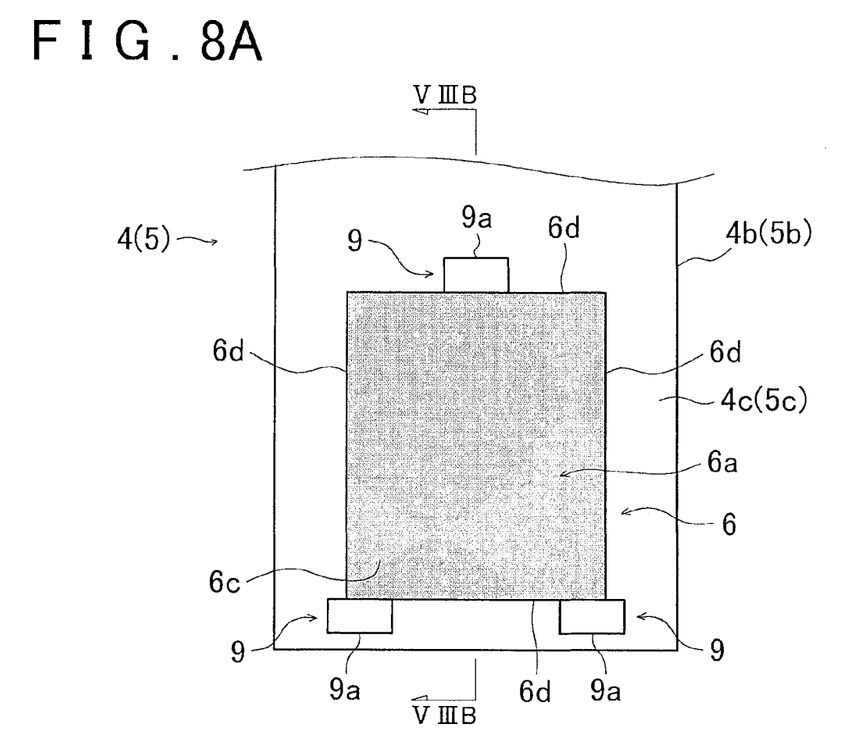
FIG. 8A is a detailed front view showing a frame format of a contact portion provided with a separate positioning member in a grasping apparatus according to another example embodiment of the invention.

Here, another example embodiment for positioning the workpiece using the grasping apparatus 1 will be described with reference to FIGS. 8A and 8B. In the grasping apparatus 1 that realizes the grasping method according to this other example embodiment, each of the contact portions 6 includes protruding members 9 that serve as separate positioning members around the bag-shaped member 6a. The positions in which these protruding members 9 are arranged, and the number of these protruding members 9, may be selected appropriately according to the shape of the workpiece or the like.

The protruding members 9 are members for displacing and positioning the workpiece by contacting the workpiece at a predetermined position thereof and pushing it (i.e., the workpiece). Each of the protruding members 9 includes a contacting member 9a and a supporting member 9b. The supporting member 9b is a member for supporting the contacting member 9a in a displaceable state. For example, a cylinder mechanism or a spring mechanism or the like may be employed for this supporting member 9b.

Figure 8B:
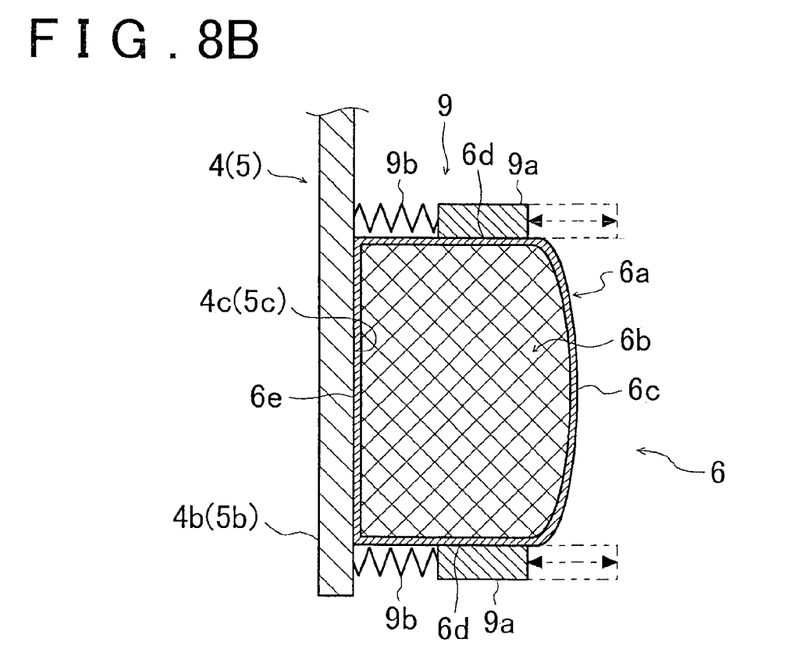
FIG. 8B is a sectional view taken along line VIIIB-VIIIB in FIG. 8A, of the contact portion provided with the separate positioning member in the grasping apparatus according to the other example embodiment of the invention.

Also, as shown in FIG. 8B, when positioning the workpiece by abutting the contacting member 9a against the workpiece, the supporting member 9b is extended to displace the contacting member 9a to a position where it (i.e., the contacting member 9a) protrudes from the front portion 6c of the bag-shaped member 6a. On the other hand, when not positioning the workpiece by the protruding members 9, the contacting member 9a is displaced to a position where it does not protrude from the front portion 6c of the bag-shaped member 6a by retracting the supporting member 9b.

That is, the workpiece can also be positioned using the grasping apparatus 1 by equipping the grasping portion 2 with protruding members 9 having this kind of structure, instead of by a method that involves deforming the bag-shaped member 6a.

The invention claimed is:

1. A grasping method by a grasping apparatus that is provided with a grasping portion that grasps a workpiece and has a plurality of pawl portions that grip the workpiece, and a plurality of contact portions that are provided on portions of the plurality of pawl portions, which contact the workpiece, and that are able to be hardened, the method comprising:
   conforming the contact portions to an outer shape of a master workpiece that has an outer shape that is able to deform the contact portions to a shape for positioning the workpiece;
   hardening the contact portions in a state conformed to the outer shape of the master workpiece and deformed to the shape for positioning the workpiece;
   positioning the workpiece by pushing the workpiece with the contact portions having the shape for positioning the workpiece; and
   grasping the positioned workpiece with the grasping portion.

2. The grasping method according to claim 1, wherein each of the contact portions includes a bag-shaped member made of elastic material, and a granular substance filled in the bag-shaped member; and the grasping portion grasps the workpiece by gripping the workpiece with the plurality of contact portions, by displacing the plurality of pawl portions, and while gripping the workpiece, hardening the granular substance while keeping the granular substance in a shape conformed to the outer shape of the workpiece, by increasing a volume ratio of the granular substance with respect to an inner volume of the bag-shaped member.

3. The grasping method according to claim 1, further comprising, after positioning the workpiece and before grasping the workpiece with the grasping portion, relaxing the shape for positioning the workpiece, of the contact portions.

* * * * *